United States Patent [19]
Breda

[11] Patent Number: 5,229,844
[45] Date of Patent: Jul. 20, 1993

[54] DEVICE FOR THE ANALYSIS OF INTERFEROMETRICAL SENSORS OF MICROMOVEMENTS

[75] Inventor: Jean-Marc Breda, Paris, France

[73] Assignee: Sextant Avionique, Meudon La Foret, France

[21] Appl. No.: 808,917

[22] Filed: Dec. 18, 1991

[30] Foreign Application Priority Data

Dec. 18, 1990 [FR] France .................. 90 15852

[51] Int. Cl.$^5$ .................................. G01B 11/02
[52] U.S. Cl. ........................... 356/358; 356/349; 356/363
[58] Field of Search ............... 356/349, 358, 363, 356

[56] References Cited

U.S. PATENT DOCUMENTS 5,106,192 4/1992 Tucker et al. .................. 356/358

FOREIGN PATENT DOCUMENTS

0401694 12/1990 European Pat. Off. .
3044183 6/1982 Fed. Rep. of Germany .
3208512 9/1982 Fed. Rep. of Germany .

Primary Examiner—Samuel A. Turner
Assistant Examiner—La Charles P. Keesee
Attorney, Agent, or Firm—Oblon, Spivak, McClelland, Maier & Neustadt

[57] ABSTRACT

The disclosed device for the analysis of interferometrical sensors of micromovements comprises N light sources, each connected by an optical fiber to a measurement interferometer. Other optical fibers connect the former optical fibers to a single analysis device. The ends of the latter optical fibers are arranged in a circle with a small radius, facing a collimation lens. The output of the analysis interferometer is followed by an optical focusing device and a cell-based detector arranged in a circle.

8 Claims, 7 Drawing Sheets

DEVICE FOR THE ANALYSIS OF INTERFEROMETRICAL SENSORS OF MICROMOVEMENTS

BACKGROUND OF THE INVENTION

1. Field of the Invention

The invention relates to a device for the analysis of interferometrical sensors of micromovements.

2. Description of the Prior Art

A known method of carrying out a measurement of micromovements makes use of a fiber sensor with coupled interferometers. This sensor is essentially constituted by a Michelson interferometer for measurement, a multimode optical fiber to convey information to the analyzing device and a second Michelson interferometer for the analysis. This method has many advantages, including very high sensitivity and total immunity to external disturbances.

One of the main drawbacks of the measurement device implementing this method is the need for an extremely precise Michelson interferometer in the analyzing device, hence its high cost. When a measuring system with several sensors has to be made, it is necessary to have as man analyzing interferometers as there are sensors. This makes the multiple sensor system very costly.

An object of the present invention is a multiple sensor measurement system that costs as little as possible and, at the same time, has the same precision as the known system.

SUMMARY OF THE INVENTION

The multiple sensor system of the invention comprises several (N) sensors, each having a measurement interferometer, wherein each measurement interferometer is connected by an optical fiber to an analysis device having only one common analysis interferometer, the ends of the different optical fibers, on the analysis side, being arranged in a circle and cooperating with an optical collimation device placed before the analyzing interferometer.

BRIEF DESCRIPTION OF THE DRAWINGS

The invention shall be understood more clearly from the following detailed description of several embodiments, taken as non-restrictive examples and illustrated by the appended drawings, of which.

MORE DETAILED DESCRIPTION

Figure 1:
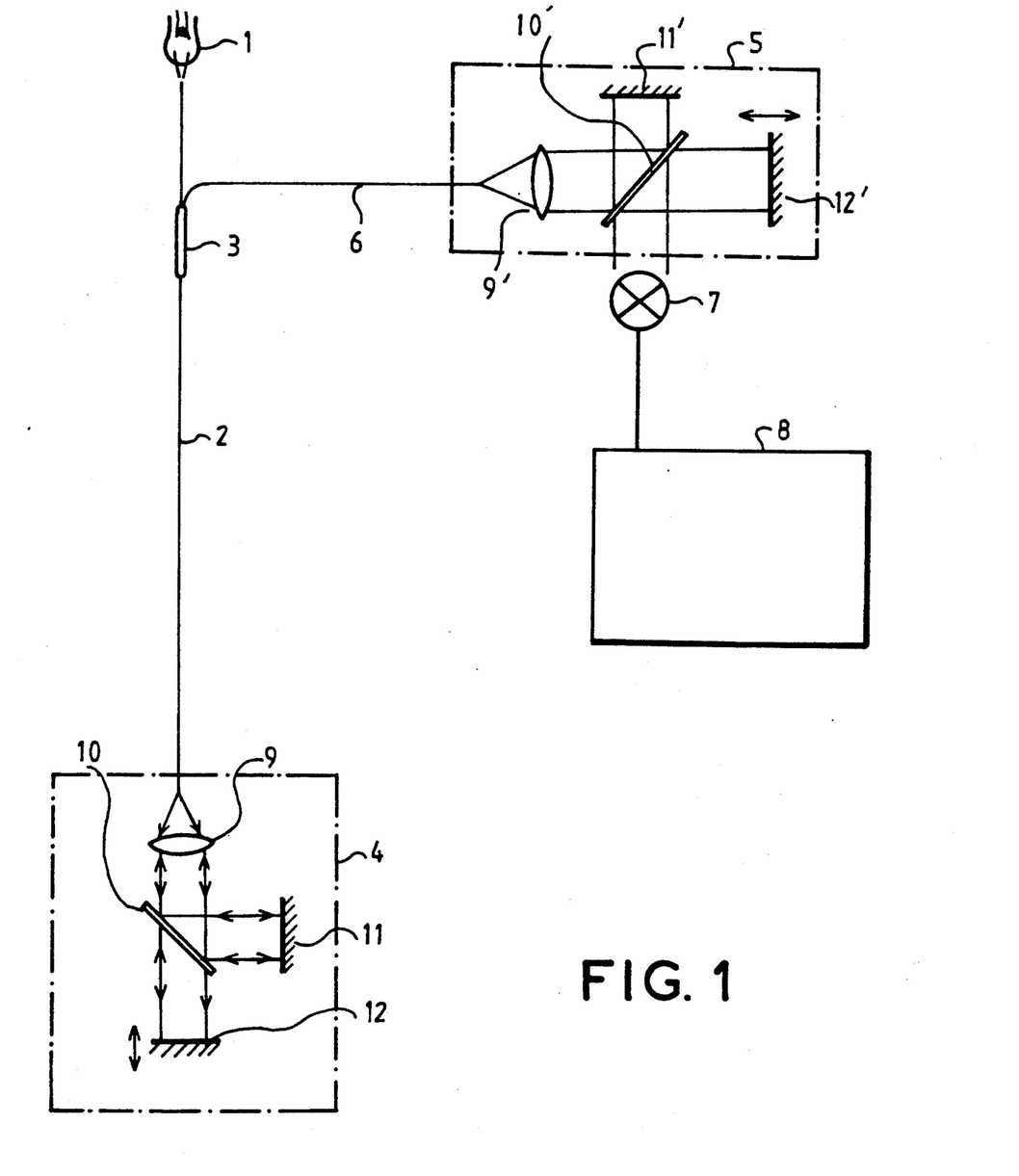
FIG. 1, relating to the prior art, is a simplified drawing of a sensor with coupled interferometers.

The sensor with coupled interferometers of figure 1, essentially comprises: a source of white light 1 (incandescent lamp or electroluminescent diode), a multimode fiber 2 having one of its ends illuminated by the source 1, a coupler 3 placed on the fiber 2, a Michelson interferometer 4 cooperating with the other end of the fiber 2, a second Michelson interferometer 5, placed at one end of an optical fiber 6 connected by its other end to the coupler 3, and cooperating with a detector 7 connected to an electronic measuring device 8.

The interferometer 4 comprises: a collimation optical device 9, a semi-reflective plate 10, a fixed reference mirror 11 and a movable mirror 12 which is subjected to the micromovements to be measured. The second interferometer 5 includes the same elements as the first one: these elements of the interferometer 5 are respectively referenced 9' to 12'.

Figure 2:
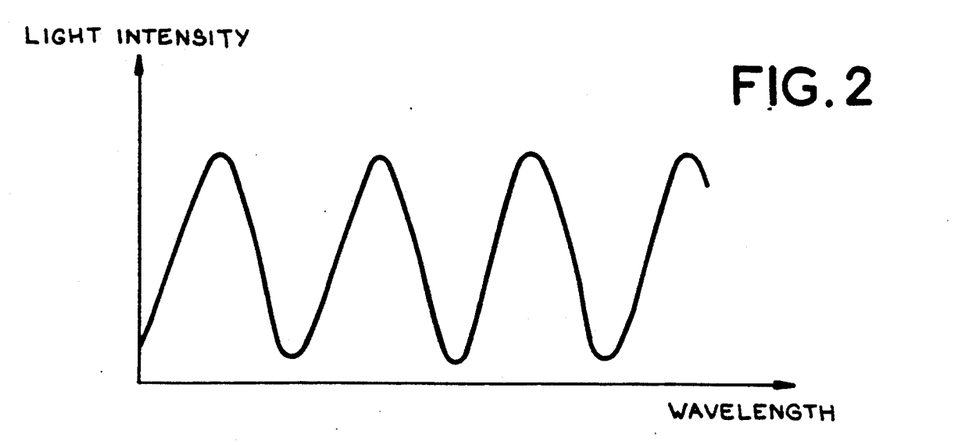
FIGS. 2 and 3 are respectively a graph of a furrowed spectrum and an interferogram, capable of being observed in the sensor of figure 1.

The following is the working of this known device. The white light coming from the source 1 is conveyed by the fiber 2, in crossing the coupler 3, up to the interferometer 4. The lens 9 converts the divergent beam coming from the fiber 2 into a parallel beam. This parallel beam is separated into two parts 13A and 13B by the plate 10. After reflection on the mirrors 11 and 12, these two beam parts return to the lens 9. A part of the energy of the beams thus reflected is sent back in the fiber 2. It is shown that the spectrum of the light sent back in the fiber 2 is a furrowed spectrum as shown in FIG. 2. If the equivalent optical thickness of the interferometer 4 is referenced a, the position of the grooves in the spectrum is given by the relationship:

$$2a = K\lambda \text{ (with K = integer and } \lambda = \text{wavelength)}$$

Figure 3:
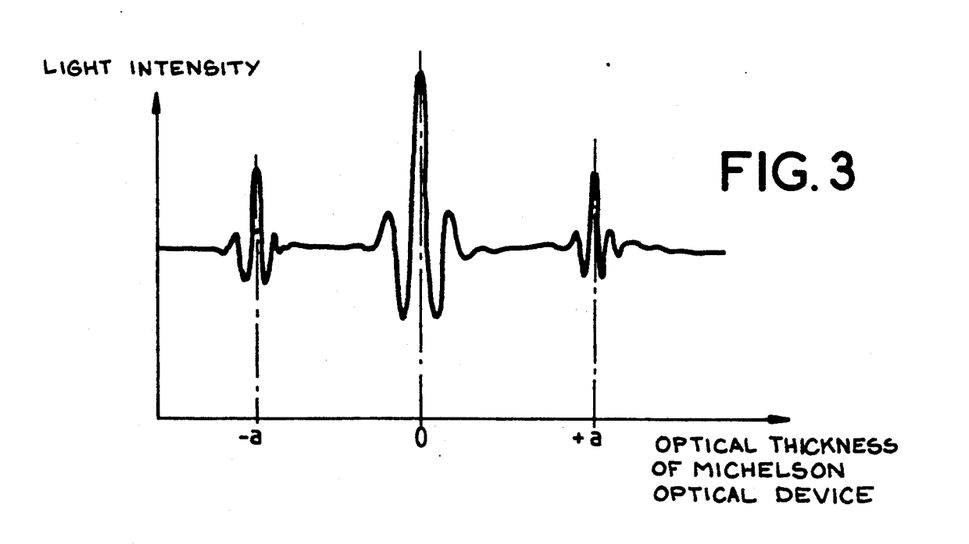

The light displaying this furrowed spectrum reaches the interferometer 5 by the fiber 2 and the coupler 3. The interferometer 5 filters this light a second time and sends it to the detector 7. It is also shown that when the movable mirror of the interferometer 5 is shifted, the optical signal received by the detector is an interferogram. This interferogram is formed by a central signal surrounded by two symmetrical secondary signals. It is shown that the maximum of the central signal is obtained for a zero optical thickness of the interferometer, and that the maximum values of the secondary signals are obtained for interferometer thicknesses equal to +a and −a. With the position of the movable mirror of the second interferometer 5 being known as a function of time, it is possible, by identifying the maximum values, to find a and hence to know the micromovements of the movable mirror of the first interferometer 4.

Figure 4:
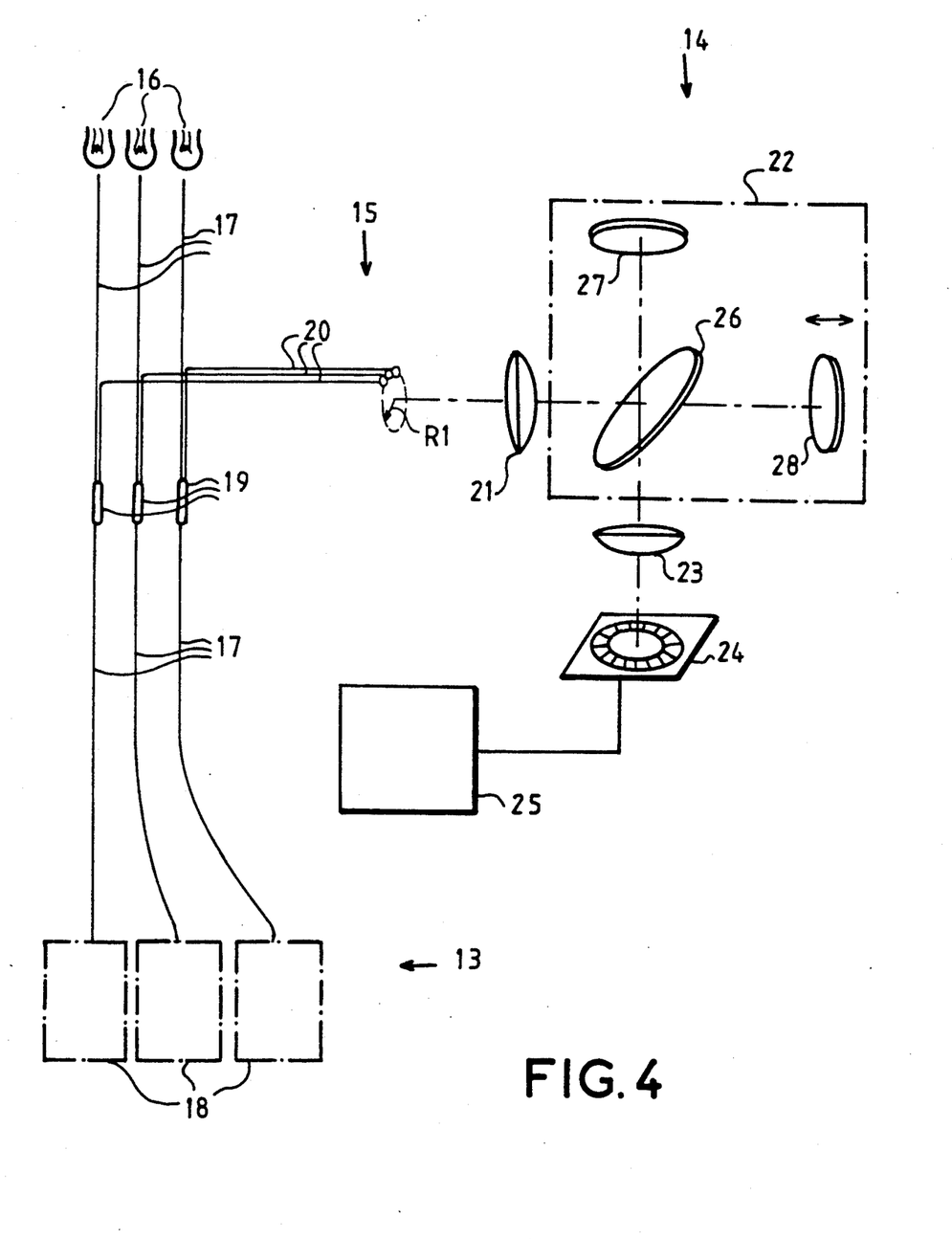
FIG. 4 is a simplified diagram of a device according to the invention.

The multiple sensor measuring device of the invention, shown in FIG. 4, essentially comprises the following for N sensors: a set 13 of N measuring heads, a single analyzing head 14 and a linking device 15 to link the N measuring heads and the analyzing head.

Each of the N measuring heads includes: a light source 16, a fiber 17 connecting the source to an interferometer 18 and a coupler 19 positioned on the fiber 17. The device 15 includes N fibers 20 respectively connecting each of the N couplers 19 to the input of the analyzing head 14. According to a preferred embodiment of the invention, the ends of the N fibers 20 are positioned in a circle with a radius R1.

The analyzing head 14 includes an optical collimation device 21 with a focal length f1, an interferometer 22, an optical focusing device 23 with a focal length f2, a detector 24 and an electronic analyzing device 25. The interferometer 22 includes a semi-reflecting plate 26, a fixed mirror 27 and a movable mirror 28. The electronic analyzing device 25 is of a type known per se. The detector 24 comprises N photosensitive cells, for example CCD cells, positioned in a circle with a radius R2. The interferometer 22 could also be of another type: Fabry-Perot or Sagnac for example.

Figure 5:
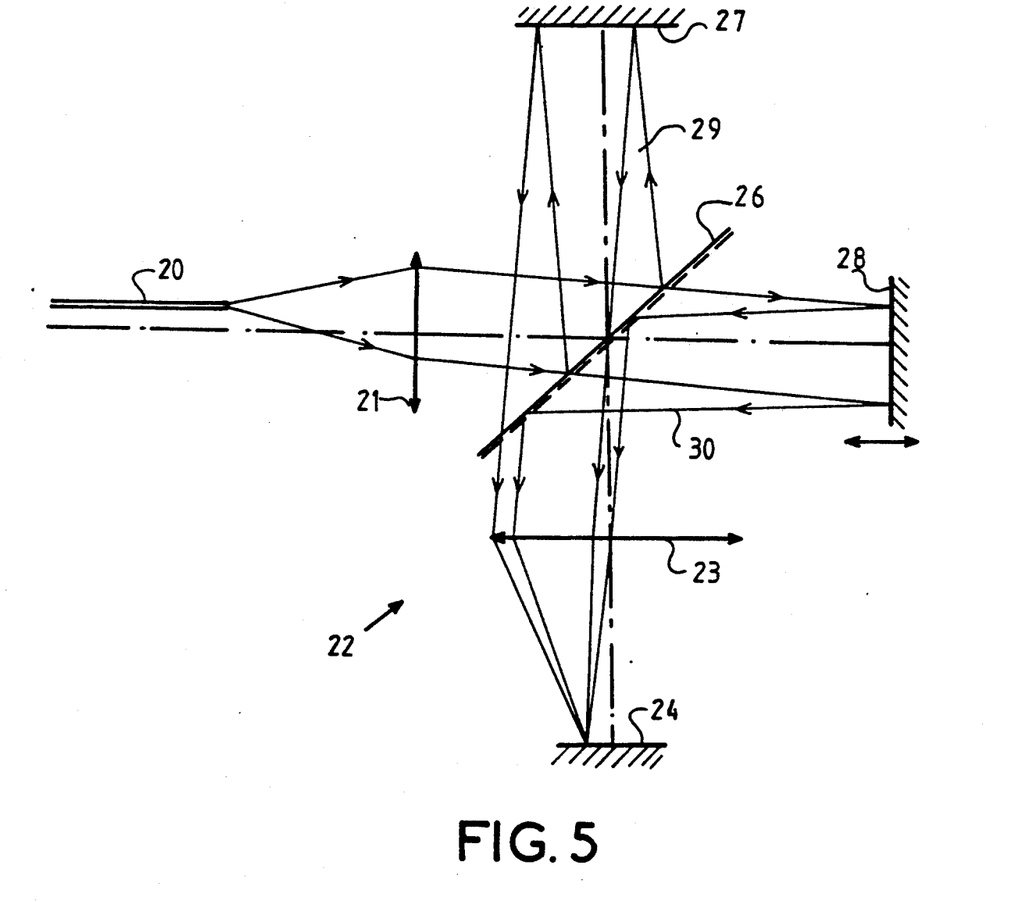
FIG. 5 is a diagram illustrating the principle of operation of an interferometer of the device of FIG. 4.

The working of the measuring device described here above is as follows. At a given instant t, the N interferometers 18 record micromovements that are referenced $a_i$ (with i varying from 1 to N). the N luminous information elements coming from these N interferometers 18 reach the end of the fibers 20. For each fiber, the path followed by the light is then the following (FIG. 5): the light beam is first of all collimated by the optical device 21 which converts it into a parallel beam. It is shown that this beam forms an angle $\theta$ with the optical device 21, equal to:

$$\theta = \text{arc tg } RF/f1$$

This beam is then separated by the plate 26 into two beams 29 and 30. These beams arrive respectively on the mirrors 27 and 28 with an incidence 8, are reflected by these mirrors, pass again through the plate 26 and are then focused by the optical device 23 on a cell Ci of the device 24 (i having one of the values 1 to N). This result is independent of the movements of the movable mirror 28 and it is shown that this is possible provided that:

$$\frac{R1}{f1} = \frac{R2}{f2}$$

It is also shown that, in this case, the equivalent optical thickness b of the interferometer 22 is equal to:

$$b = a \cos \theta$$

with a = optical thickness on the axis of the mirrors 27, 28.

By the symmetry of the system, all the paths followed by all the beams coming from the fibers 20 are equal and each of them ends at a different cell Ci of the device 24.

When a movable mirror 28 is shifted therefore, a simultaneous recording is done of all the N interferograms of the N sensors Ci of the device 24. It is then enough to identify the maximum values of intensity on each cell Ci to deduce therefrom the different micromovements $a_i$ of the movable mirrors of the interferometers 18.

Figure 6:
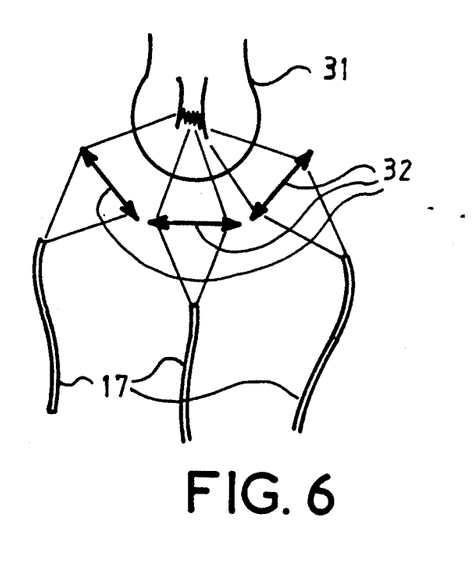
FIG. 6 is a simplified diagram showing the arrangement of a plurality of fibers coupled to a single light source.

According to the embodiment of FIG. 6, the N sources of light 16 can be replaced by a single source 1 supplying the N fibers 17, each time by means of an optical condensation device 32.

Figure 7:
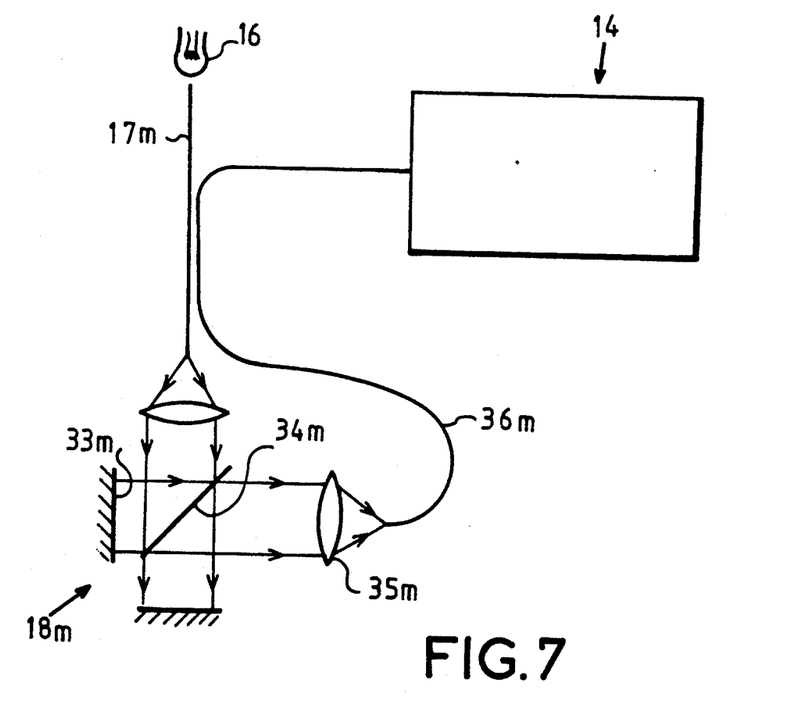
FIG. 7 is a simplified diagram of a variant of the device of the invention, without a coupler.

According to the embodiment of FIG. 7, it is possible to eliminate the couplers 19 and, in order to recover the light beams produced by the different interferometers 18, to make use of a fiber placed in the unused channel of each of these measuring interferometers. This figure 7 shows only one of the N measuring interferometers, referenced 18m, with the corresponding fiber 17 and light source 16m (or the single source 31 if the embodiment of FIG. 6 is used). In the interferometer 18m, the light sent back by the fixed mirror 33m to the semi-reflecting plate 34m is directed to an optical focusing device 35 which sends it to a fiber 36m. This fiber 36m is connected to the device 14 in the same way as the fibers 20.

Figure 8:
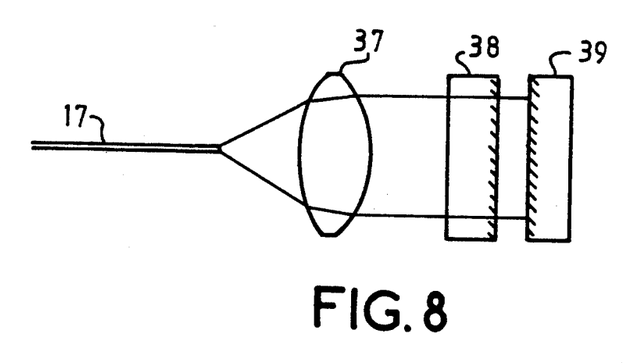
FIG. 8 is a drawing of a Fizeau interferometer measuring head that can be used in the device of the invention.

As shown in FIG. 8, the Michelson interferometer can be replaced by a Fizeau interferometer in the measuring head. The end of an optical fiber, such as the fiber 17, is placed at the focal point of an optical collimation device 37 behind which there are positioned a fixed mirror 38 and a movable mirror 39.

Figure 9:
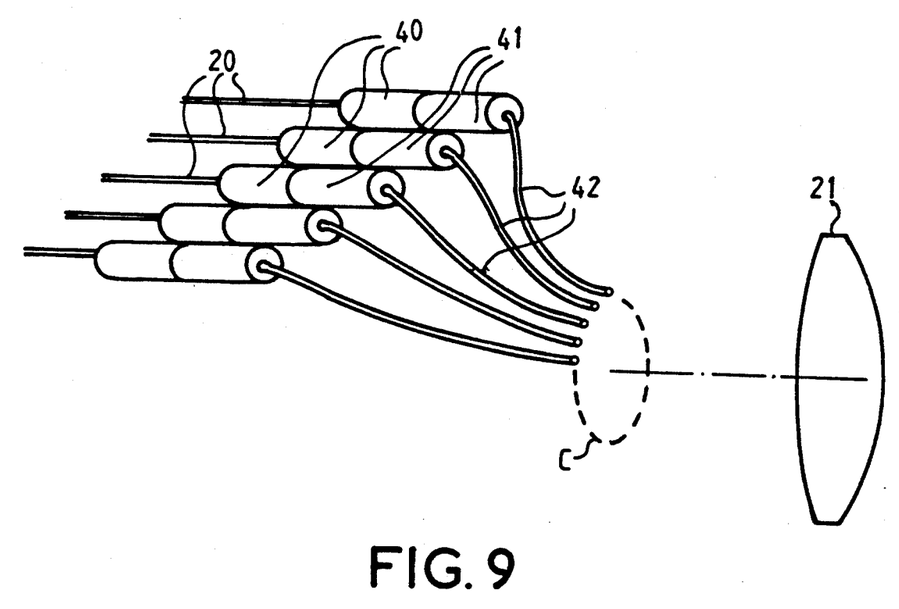
FIG. 9 is a drawing showing an example of the connection of connectors in the device of the invention.

In the device 15 of the analyzing head, it is advantageous, for reasons related to space factor and ease of optical and mechanical construction, to arrange the ends of the optical fibers (20 or 36) in a circle with a small radius. This radius is typically equal to some millimeters. If optical fibers provided with connectors are used, this cannot be done. According to the approach shown in FIG. 9, it is then possible, all the same, to keep a small radius. To this effect, each connector 40 of a fiber 20 is coupled to a corresponding connector connected to a relay fiber 42, the free end of which is positioned in a circle C with a small radius (some millimeters) facing the optical device 21.

Figure 10:
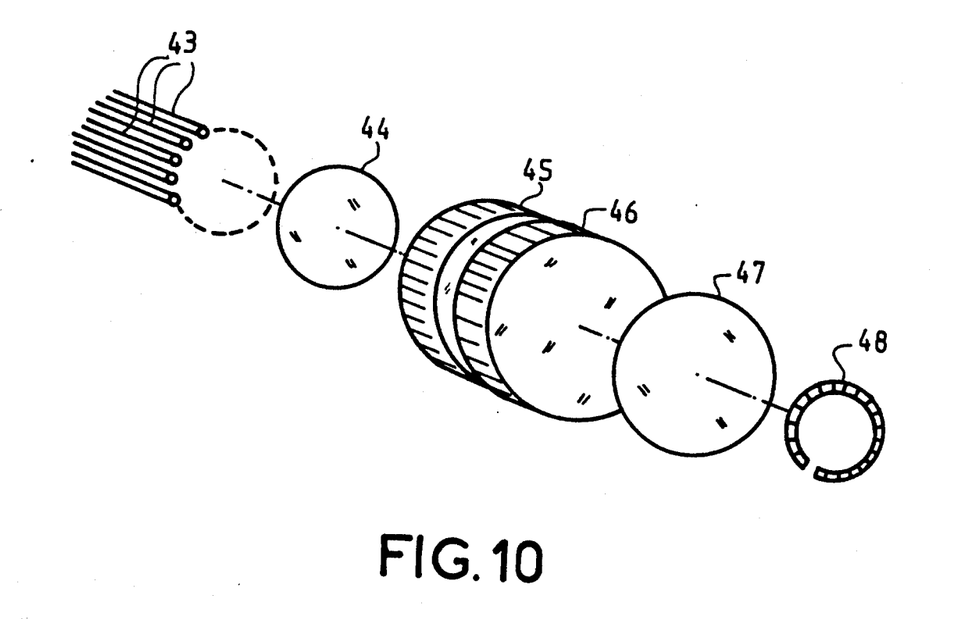
FIG. 10 is a simplified view of a Fizeau interferometer analyzing head.

As mentioned here above, the analysis device of the invention may work with other types of interferometers, for example a Fizeau interferometer. FIG. 10 shows an exploded view of a measuring head using an interferometer such as this. Facing the ends of N optical fibers 43 arranged in a circle with a small radius (some millimeters), there are respectively positioned an optical collimation device 44, a fixed mirror 45, a movable mirror 46, an optical focusing device 47 and a sensor device 48 comprising N elementary sensors, for example CCD sensors, arranged in a circle with a small radius. The device 48 is connected to an electronic analyzing device similar to the device 25. It is also possible to use Fabry-Perot or Sagnac interferometers for measurement and/or for analysis.

In the analyzing head of the invention, the movements of the movable mirror of the analysis mirror should be made with extreme precision. An advantageous way of achieving this is to mount the movable mirror on piezoelectric shims, the micromovements of which are controlled, in a manner known per se, by electrical voltages.

One of the main advantages of the device of the invention is to enable the analysis of N sensors by means of only one interferometer, without resorting to standard multiplexing devices which generally have the drawback of having low photometrical output values (of the order of 1/N for N sensors).

Other advantages are related to the distribution of the radial symmetry of the fibers and sensors. This distribution enables working with simple focusing and collimation devices owing to the fact that they work for a single field. Furthermore, this distribution makes it possible to obtain identical optical paths, irrespectively of the fiber (among the N fibers) that is used and, consequently, to use the same processing algorithm for all the sensors, which could not be the case with another arrangement of fibers: for example fibers arranged linearly or in a matrix.

What is claimed is:

1. A device for the analysis of interferometrical sensors of micromovements, in a system comprising a plurality of sensors each having a measurement interferometer, wherein all of the measurement interferometers are connected by respective optical fibers to an analysis device having only one common analysis interferometer, the ends of the different optical fibers, on the analysis side, being arranged in a circle and cooperating with an optical collimation device placed before the analyzing interferometer.

2. A device according to claim 1, wherein the analysis device includes a collimation device positioned at the output of the analysis interferometer and followed by a circular detector formed by N photosensitive cells.

3. A device according to claim 1, wherein a single source of light cooperates with several optical fibers of sensors, by means of condensation devices.

4. A device according to claim 1 wherein, for each sensor, the optical fiber connecting the measurement interferometer to the analysis device is connected to a coupler positioned on the optical fiber connecting the light source to the measurement interferometer.

5. A device according to claim 1 wherein, for each sensor, the optical fiber connecting the measurement interferometer to the analysis device is positioned in the unused channel of the measurement interferometer.

6. A device according to claim 1, the fibers of which, connecting the measurement interferometers to the analysis device, include connectors, wherein said connectors are connected by corresponding connectors to relay fibers, the free ends of which are arranged in a circle.

7. A device according to claim 1, comprising Michelson interferometers.

8. A device according to claim 1, comprising at least one of the following interferometers: Fizeau, Fabry-Perot, Sagnac.

* * * * *